(12) United States Patent
Golov

(10) Patent No.: US 11,691,638 B2
(45) Date of Patent: *Jul. 4, 2023

(54) DETERMINATION OF RELIABILITY OF VEHICLE CONTROL COMMANDS USING A VOTING MECHANISM

(71) Applicant: Micron Technology, Inc., Boise, ID (US)

(72) Inventor: Gil Golov, Backnang (DE)

(73) Assignee: Micron Technology, Inc., Boise, ID (US)

( * ) Notice: Subject to any disclaimer, the term of this patent is extended or adjusted under 35 U.S.C. 154(b) by 87 days.

This patent is subject to a terminal disclaimer.

(21) Appl. No.: 17/172,946

(22) Filed: Feb. 10, 2021

(65) Prior Publication Data

US 2021/0163024 A1 Jun. 3, 2021

Related U.S. Application Data

(63) Continuation of application No. 15/855,734, filed on Dec. 27, 2017, now Pat. No. 10,933,882.

(51) Int. Cl.
*B60W 50/02* (2012.01)
*G05D 1/00* (2006.01)

(52) U.S. Cl.
CPC ....... *B60W 50/0205* (2013.01); *G05D 1/0088* (2013.01); *B60W 2050/021* (2013.01); *B60W 2710/20* (2013.01); *B60W 2720/106* (2013.01)

(58) Field of Classification Search
CPC ....... B60W 50/0205; B60W 2050/021; B60W 2710/20; B60W 2720/106; B60W 50/023; G05D 1/0088

USPC ............................................................ 701/3
See application file for complete search history.

(56) References Cited

U.S. PATENT DOCUMENTS

| 6,108,598 | A | 8/2000 | Sumitani |
| 7,509,567 | B1 | 3/2009 | Kiselev et al. |
| 8,145,822 | B2 | 3/2012 | Hachmann et al. |
| 8,601,321 | B2 * | 12/2013 | Feng ............... G01R 31/31719 714/27 |
| 8,751,860 | B2 | 6/2014 | Feeley et al. |
| 9,110,832 | B2 | 8/2015 | Feeley et al. |

(Continued)

OTHER PUBLICATIONS

Determination of Reliability of Vehicle Control Commands via Memory Test, U.S. Appl. No. 15/855,175, filed Dec. 27, 2017, Gil Golov, Notice of Allowance Mailed—Application Received in Office of Publications, dated Dec. 18, 2020.

(Continued)

*Primary Examiner* — Masud Ahmed
(74) *Attorney, Agent, or Firm* — Greenberg Traurig

(57) ABSTRACT

A vehicle having a control element for the speed, acceleration or direction of the vehicle, multiple identical or redundant computing devices (e.g., each implemented as a system on chip (SoC)) to separately generate driving commands in parallel during autonomous driving of the vehicle, and a command controller coupled between the control element and the computing devices. The commands may have one or more matching groups, where commands within each respective group agree with each other and thus vote for a candidate command representing the group. The computing device outputs a candidate command that represents the largest group for execution by the control element.

20 Claims, 9 Drawing Sheets

(56) References Cited

U.S. PATENT DOCUMENTS

| | | | |
|---|---|---|---|
| 9,331,989 B2 | 5/2016 | Dover | |
| 9,502,128 B2 | 11/2016 | Lee | |
| 9,533,579 B2 | 1/2017 | Nomura | |
| 9,569,622 B2 * | 2/2017 | Dover | G06F 21/575 |
| 9,613,214 B2 * | 4/2017 | Dover | G06F 21/57 |
| 10,431,299 B2 | 10/2019 | Tokutomi et al. | |
| 10,836,402 B2 | 11/2020 | Golov | |
| 10,901,862 B2 | 1/2021 | Golov | |
| 10,933,882 B2 | 3/2021 | Golov | |
| 10,981,576 B2 | 4/2021 | Golov | |
| 2006/0212195 A1 | 9/2006 | Veith et al. | |
| 2009/0210777 A1 | 8/2009 | Weiberle et al. | |
| 2012/0102477 A1 | 4/2012 | Kim et al. | |
| 2013/0166866 A1 | 6/2013 | Yerushalmi et al. | |
| 2014/0140135 A1 | 5/2014 | Okano et al. | |
| 2014/0208151 A1 | 7/2014 | Fernandez | |
| 2014/0229724 A1 | 8/2014 | Chen et al. | |
| 2015/0088358 A1 | 3/2015 | Yopp | |
| 2015/0094899 A1 | 4/2015 | Hackenberg et al. | |
| 2015/0280919 A1 * | 10/2015 | Cullen | G05D 1/0077 701/3 |
| 2015/0331055 A1 | 11/2015 | Oi et al. | |
| 2016/0162422 A1 | 6/2016 | Weber | |
| 2016/0349692 A1 | 12/2016 | Tomimatsu | |
| 2017/0024127 A1 | 1/2017 | Bazarsky et al. | |
| 2017/0075352 A1 * | 3/2017 | Nordbruch | G01C 21/36 |
| 2017/0090476 A1 | 3/2017 | Letwin et al. | |
| 2017/0180929 A1 | 6/2017 | Cavendish et al. | |
| 2017/0243484 A1 | 8/2017 | Li et al. | |
| 2017/0300052 A1 | 10/2017 | Harda et al. | |
| 2017/0351968 A1 | 12/2017 | Bowers et al. | |
| 2017/0361712 A1 | 12/2017 | Terao et al. | |
| 2018/0039538 A1 | 2/2018 | Freikorn et al. | |
| 2018/0074718 A1 | 3/2018 | Lee | |
| 2018/0086267 A1 | 3/2018 | Nix | |
| 2018/0203622 A1 | 7/2018 | Ishiguro | |
| 2019/0163367 A1 | 5/2019 | Bazarsky et al. | |
| 2019/0180526 A1 | 6/2019 | Mehdizade et al. | |
| 2019/0193745 A1 | 6/2019 | Golov | |
| 2019/0193746 A1 | 6/2019 | Golov | |
| 2019/0193747 A1 | 6/2019 | Golov | |
| 2020/0125441 A1 | 4/2020 | Omori et al. | |
| 2020/0142472 A1 | 5/2020 | Golov | |
| 2020/0151067 A1 | 5/2020 | Golov | |
| 2021/0046944 A1 | 2/2021 | Golov | |
| 2021/0141699 A1 | 5/2021 | Golov | |
| 2021/0229684 A1 | 7/2021 | Golov | |

OTHER PUBLICATIONS

Determination of Reliability of Vehicle Control Commands via Redundancy, Gil Golov, Patented Case, Oct. 28, 2020.

Determination of Reliability of Vehicle Control Commands Via Redundancy, U.S. Appl. No. 17/089,099, filed Nov. 4, 2020, Gil Golov, Application Dispatched from Preexam, Not Yet Docketed, Nov. 10, 2020.

Determination of Reliability of Vehicle Control Commands using a Voting Mechanism, U.S. Appl. No. 15/855,734, filed Dec. 27, 2017, Gil Golov, Publications—Issue Fee Payment Verified, Jan. 11, 2021.

Data Link Between Volatile Memory and Non-Volatile Memory, U.S. Appl. No. 16/179,072, filed Nov. 2, 2018, Gil Golov, Non Final Action, dated Dec. 11, 2020.

High-Reliability Non-Volatile Memory Using a Voting Mechanism, U.S. Appl. No. 16/189,697, filed Nov. 13, 2018, Gil Golov, Patented Case, Jan. 6, 2021.

High-Reliability Non-Volatile Memory Using a Voting Mechanism, U.S. Appl. No. 17/155,641, filed Jan. 22, 2021, Gil Golov, Application Undergoing Preexam Processing, Jan. 22, 2021.

International Search Report and Written Opinion, Int. App. No. PCT/US2018/052634, dated Jan. 20, 2019.

International Search Report and Written Opinion, PCT/US2019/058936, dated Feb. 21, 2020.

P. Balasubramanian et al., "A Fault Tolerance Improved Majority Voter for TMR System Architectures", WSEAS Transactions on Circuits and Systems, vol. 15, 2016, pp. 108-122.

RAID, https://en.wikipedia.org/wiki/RAID, printed on Oct. 25, 2018, 11 pages.

Sandeep Kaushik, Yervant Zorian, "Embedded memory test and repair optimizes SoC yields", Jul. 17, 2012.

Backhausen, Ulrich, et al. "Robustness In Automotive Electronics: An Industrial Overview Of Major Concerns." IEEE, Jul. 3, 2017.

Humphry, Jonathan, et al. "A Fault-Tolerant/Fail-Safe Command And Control System For Automated Vehicles." IEEE, Mar. 23, 2015.

* cited by examiner

DETERMINATION OF RELIABILITY OF VEHICLE CONTROL COMMANDS USING A VOTING MECHANISM

RELATED APPLICATION

The present application is a continuation application of U.S. patent application Ser. No. 15/855,734, filed Dec. 27, 2017 and entitled "Determination of Reliability of Vehicle Control Commands using a Voting Mechanism," the entire disclosure of which application is hereby incorporated herein by reference.

The present application is related to U.S. patent application Ser. No. 15/855,175, filed on Dec. 27, 2017 and entitled "Determination of Reliability of Vehicle Control Commands via Memory Test", and U.S. patent application Ser. No. 15/855,451, filed on Dec. 27, 2017 and entitled "Determination of Reliability of Vehicle Control Commands via Redundancy", the entire disclosures of which applications are hereby incorporated herein by reference.

FIELD OF THE TECHNOLOGY

At least some embodiments disclosed herein relates to vehicle control in general and more particularly, but not limited to, the reliability of commands generated by computing devices for autonomous control of vehicles.

BACKGROUND

Recent developments in the technological area of autonomous driving allow a computing system to operate, at least under some conditions, control elements of a vehicle without the assistance from a human operator of the vehicle.

For example, sensors (e.g., cameras and radars) can be installed on a vehicle to detect the conditions of the surroundings of the vehicle on a roadway. A computing system installed on the vehicle analyzes the sensor inputs to identify the conditions and generate control signals or commands for the autonomous adjustments of the direction and/or speed of the vehicle, without any input from a human operator of the vehicle.

In some arrangements, when a computing system recognizes a situation where the computing system may not be able to continue operating the vehicle in a safe manner, the computing system alerts the human operator of the vehicle and requests the human operator to take over the control of the vehicle and drive manually, instead of allowing the computing system to drive the vehicle autonomously.

U.S. Pat. App. Pub. No. 2015/0094899, entitled "Method for Driver Assistance System of a Vehicle" and published on Apr. 2, 2015, discloses a method to alert a driver to take control of the vehicle, when the distance between the current location of the vehicle and an end of a route section that has been identified for driving by the computing system is shorter than a threshold. U.S. Pat. App. Pub. No. 2017/0300052, entitled "Handover Notification Arrangement, a Vehicle and a Method of Providing a Handover Notification" discloses a further technique to hand over the control of the vehicle back to a human driver.

U.S. Pat. No. 9,533,579, entitled "Electronic Control Apparatus for Electrically-Driven Vehicle" and published Jan. 3, 2017, discloses an electronic control apparatus of a vehicle that has a self-diagnosis function.

U.S. Pat. No. 8,601,321, entitled "System-on-a-Chip (SoC) Test Interface Security" and published Dec. 3, 2013, discloses a System on Chip (SoC) that, during a time to boot up its processor, reads a memory area storing a scrambled portion of firmware to create a descrambled value for a determination of whether a test interface to access the processor by an external device is authorized.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
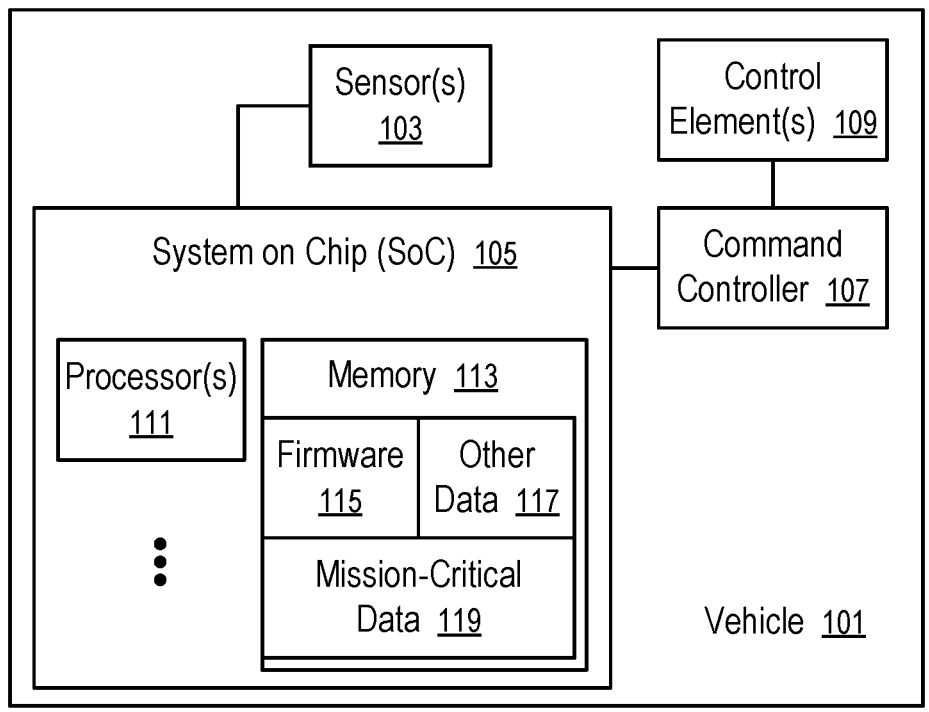
FIG. 1 shows a vehicle having a command controller according to one embodiment.

At least some embodiments disclosed herein provide a command controller that determines the reliability of a command generated by a computing device for the autonomous driving of a vehicle by testing a portion of the memory of the computing device. The command controller blocks the command and/or initiates an emergency response when the computing device fails the memory test.

To reduce the amount of memory tests performed during the autonomous driving of the vehicle, the vehicle may optionally be configured to have identical or redundant computing devices that operate on the same input data to generate redundant driving commands. The command controller inspects the commands received from the redundant computing devices to determine whether they agree with each other; and if so, the command controller assumes that the commands are reliable, skips the memory test, and allows the execution of one of the commands that match with each other. However, when there is a mismatch in the commands generated by the redundant computing devices, the command controller tests portions of the memories of the computing devices to identify an unreliable command generated by a faulty one of the computing devices. The unreliable command is filtered out and/or discarded. Optionally, the command controller may use the data in the healthy one of the redundant computing devices to repair the computing function of the faulty one of the computing devices.

The need for memory tests and/or diagnoses can be further reduced through the use of a voting mechanism to select a reliable command from the mismatched commands generated by redundant computing devices. For example, the command controller may compare the received commands to identify one or more matching commands. A received command that agrees with a matching command provides one vote for the matching command. The matching command having the most votes can be considered as the most reliable command and thus be selected for execution in autonomous driving of the vehicle. When the majority of the receiving commands agree with each other, it is not necessary to further check the remaining commands to determine whether they agree with the majority. In some instances, when the number of receiving commands is above a predetermined threshold, which may be less than a majority, the matching command can be selected without further comparing with the remaining received commands.

For example, when a vehicle uses a system on chip (SoC) to generate a command for an autonomous operation of a vehicle (e.g., steering the wheels of the vehicle, adjusting the speed of a motor of the vehicle, activating the brakes of the vehicle), the command controller determines whether the command can be trusted based on a determination of whether the SoC is damaged. If the SoC is damaged in part, the command generated by SoC is considered unreliable and thus can be blocked for an emergency response.

The health of the memory the SoC may be considered the proxy of the health of the SoC as a whole. When certain areas of the memory of the SoC are damaged, especially the mission critical portions of the memory, the reliability of the SoC in generating commands for autonomous driving is considered compromised. Thus, when the SoC fails a test of a mission critical part of its memory, the command generated by the SoC for autonomous driving may be blocked; and one or more safe-mode commands may be generated to place the vehicle in a safe condition.

For example, a command controller can be configured on a command communication path from the SoC to a control element that effectuates a command from the SoC. The command controller is configured to intercept the command that is issued by the SoC and that affects the operation of the control element of the vehicle. In some instances, the command is directly executed by the control element; and in other instances, the command is further processed by another computing device (e.g., another SoC) to generate control signals or commands for the control element.

In response to intercepting the command from the SoC to the control element, the command controller initiates a memory test on the SoC, preferably testing one or more mission sensitive or critical areas of the memory of the SoC, such as a memory area that stores the software/firmware used for the generation of the command, a memory area that stores the data based on which the command is generated.

If the SoC passes the test of selected areas of its memory, the controller provides the intercepted command to the vehicle for execution or effectuating by the control element; otherwise, the SoC may be considered defective, which causes the command controller to identify the command as being generated in error and prevent the command from reaching the control element, and/or causes the command controller to generate one or more basic replacement commands to place the vehicle in a safe condition.

For example, in response to the SoC failing a memory test, the command controller may request a human operator of the vehicle to take over the control of the vehicle, communicate with a remote server to obtain a replacement command if a suitable communication channel is available, activate an emergency signal of the vehicle, activate a predetermined emergency command or routine for operating the vehicle under emergency conditions (e.g., slowing down the vehicle for a stop).

In some implementations, the command controller is implemented using a computing device external to the SoC using hardware. Preferably, the hardware of the command controller is more reliable and/or durable than the SoC. Alternatively, the command controller may be implemented as part of the SoC in controlling its output using a dedicated hardware circuitry and/or firmware.

FIG. 1 shows a vehicle (101) having a command controller (107), a system on chip (SoC) (105), one or more sensors (103), and one or more control elements (109).

In FIG. 1, the command controller (107) has memory (113) and one or more processors (111); and the command controller (107) is coupled between the SoC (105) and the controller element(s) (109) to prevent commands generated by the SoC (105) from reaching the control element(s) (109) when the commands are determined to be unreliable.

In general, the command controller (107) may a self-diagnosis function to evaluate the health state of the SoC (105), including the memory (113) and the processors (111). The result of the self-diagnosis function may be used to determine the reliability of the commands generated by the SoC (105). Preferably, the reliability of the commands or outputs of the SoC (105) is tested (e.g., on a per command basis, or periodically) in real time during autonomous driving based at least in part on the results of testing one or more selected portions of the memory (113).

The SoC (105) of FIG. 1 receives data from the sensor(s) (103) and executes, using its processor(s) (111), firmware (115) stored in the memory (113) to generate commands affecting the control element(s) (109) that can effectuate the autonomous driving of the vehicle (101). For example, the sensor(s) (103) may include a visible light camera, an infrared radiation camera, a lidar (Light Detection And Ranging), a radar (RAdio Detection And Ranging), etc.

The processor(s) (111) and the memory (113) of the SoC (105) are typically sealed inside a same integrated circuity package. However, the processor(s) (111) and the memory (113) may or may not be formed on a single silicon substrate.

When the SoC (105) has a damaged circuitry (e.g., processor(s) (111)), it is likely that the memory (113) of the SoC (105) is also damaged. When a portion of the memory (113) storing the firmware (115) and/or mission-critical data (119) for the execution of the firmware (115) is determined to be damaged after the generation of a command, it is likely that the command is an erroneous result of the execution of the firmware (115). Thus, the memory testing result of the SoC (105) can be used as a proxy indicator of the health of the SoC (105) and be assessed in real time during autonomous driving.

In general, the SoC (105) may also receive inputs from other computing devices (not shown in FIG. 1) that are configured on the vehicle (101), such as an input or a command from another SoC that provides a preprocessing result of the sensor(s) (103) or another sensor (not shown in FIG. 1).

Similarly, the command or output generated by the SoC (105) may also be used as an input to other computing devices, such as another SoC, which post-processes the command or output of the SoC (105) to drive the control element(s) (109).

For example, the vehicle (101) may be configured as a car or automobile driven by an electric motor or an internal combustion engine. The control element(s) (109) may include a brake of the vehicle (101), an acceleration control of the vehicle (101), a steering control of the vehicle (101), a turn signal of the vehicle control (101), etc.

For improved reliability, the testing of the health of the SoC (105) is performed in real time in response to the command or output generated by the SoC (105), especially when the command or output has an impact on the operation of the control element(s) (109).

Performing a complete diagnosis of the SoC (105) may be time consuming and, if performed on a per command basis, may cause unacceptable delay in providing the command/output from the SoC (105) to the control element(s) (109). Optionally, a complete diagnosis of the SoC (105) may be performed during certain time periods (e.g., when the vehicle (101) is in a parking mode, during the startup of the vehicle) but not performed during the time period of active driving to avoid interference with the autonomous driving function of the SoC (105).

Preferably, the command controller (107) initiates a test of a mission critical portion of the memory (113) to balance the need for reliability check in the commands/outputs from the SoC (105) and the need to avoid excessive delay in the propagation of the commands/outputs from the SoC (105) to the control element(s) (109).

The mission critical portion of the memory (113) may include the portion storing the firmware (115) for instructing the processor(s) (111) to perform computations that result in the generation the commands/outputs of the SoC (105) and/or the portion of the memory (113) that stores the mission-critical data (119) used in generation of the commands/outputs of the SoC (105). Examples of the mission-critical data (119) include the synaptic weights of an artificial neural network for the recognition of an event or object captured by the sensor(s) (103) and/or for the generation of the driving decision responsive to the recognition of the event or object.

The memory (113) may include a portion that stores other data (117) that are not used to generate the commands/outputs of the SoC (105) and/or a portion that does not currently store any valid data when the SoC (105) outputs its command or control signals. The command controller (107) may skip the testing of such a portion of the memory (113) of the SoC (105).

The mission critical portion of the memory (113) may be are predefined. For example, the modules of a firmware (115) and the mission-critical data (119) for the generation of one command may be configured to be stored in a predefined area of the memory (113). The predefined area may be identified by one or more blocks of physical addresses or logical addresses. In response to the detection of a command in the output of the SoC (105), the predefined area of the memory (113) is tested as a proxy of the health of the SoC (105). The mission critical portion of the memory (113) may be selected based on the type of the commands/outputs generated by the SoC (105), in accordance with the identification of modules and data items responsible for the generation of the type of the commands/outputs.

Alternatively or in combination, a randomly selected portion of the memory (113) may be tested, where the test result is used as a health proxy of the SoC (105) as a whole.

The SoC (105) is optionally configured with a circuit for self-testing a portion of its memory (113). The circuit is activated by the command controller (107) to generate a test result in response to a command/output being generated by the SoC (105). In some instances, the function of the self-testing circuit is alternatively implemented by, at least in part, the processor(s) (111) executing a module of the firmware (115).

Alternatively, the command controller (107) may communicate through a test interface of the SoC (105) to access the memory (113) to perform the test of a selected portion of the memory (113) of the SoC (105).

In some instances, the function of the system on chip (105) is not implemented in a single integrated circuit chip. For example, more than one integrated circuit chip may be used to implement the function of the SoC (105) illustrated in FIG. 1. When the components for implementing the function of the system on chip (105) are located close to each other, the memory test can also be used to indicate the health of the components as a whole.

In some instances, the command controller (107) is implemented as a system on chip or an on-board computer of the vehicle (101). Alternatively, the command controller (107) may be integrated within the SoC (105).

Figure 2:
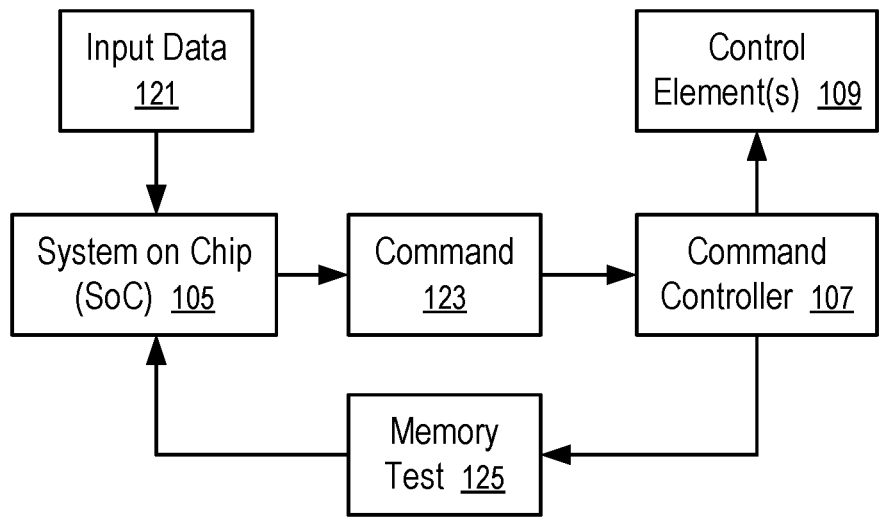
FIG. 2 illustrates the operations of a command controller to check the reliability of commands from a computing device of a vehicle according to one embodiment.

FIG. 2 illustrates the operations of a command controller to check the reliability of commands from a computing device of a vehicle according to one embodiment. For example, the operations illustrated in FIG. 2 can be implemented in a vehicle (101) illustrated in FIG. 1 or in another system.

In FIG. 2, the SOC (105) receives input data (121) to generate a command (123) that affects or controls the operation of the control element(s) (109).

The command controller (107) intercepts the command (123) on the communication path from the SoC (105) to the control element(s) (109).

In response to such a command (123), the command controller (107) generates or initiates a memory test (125).

In some implementations, the memory test (125) is for a predetermined area of the memory (113) of the SoC (105), independent on the command (123).

In other implementations, the command controller (107) selects the area of the memory (113) for the memory test (125) based on the content of the command (123).

For example, based on a type of the command (123), the command controller (107) identifies the modules of the firmware (115) that are used for the generation of the command (123) and performs, or requests, the memory test (125) of the portion of the memory (113) that stores the identified modules of the firmware (115).

For example, based on a type of the command (123), the command controller (107) identifies the data components (e.g., 119) that are used for the generation of the command (123) and performs, or requests, the memory test (125) of the portion of the memory (113) that stores the identified data components (115).

In some instances, the firmware (115) and/or the mission-critical data (119) are stored with redundancy and/or parity data that enables the testing of the health of the portion(s) of the memory (113) storing the firmware (115) and/or the data (119), without performing write operations in the tested portion(s) of the memory (113) of the SoC (105).

Figure 3:
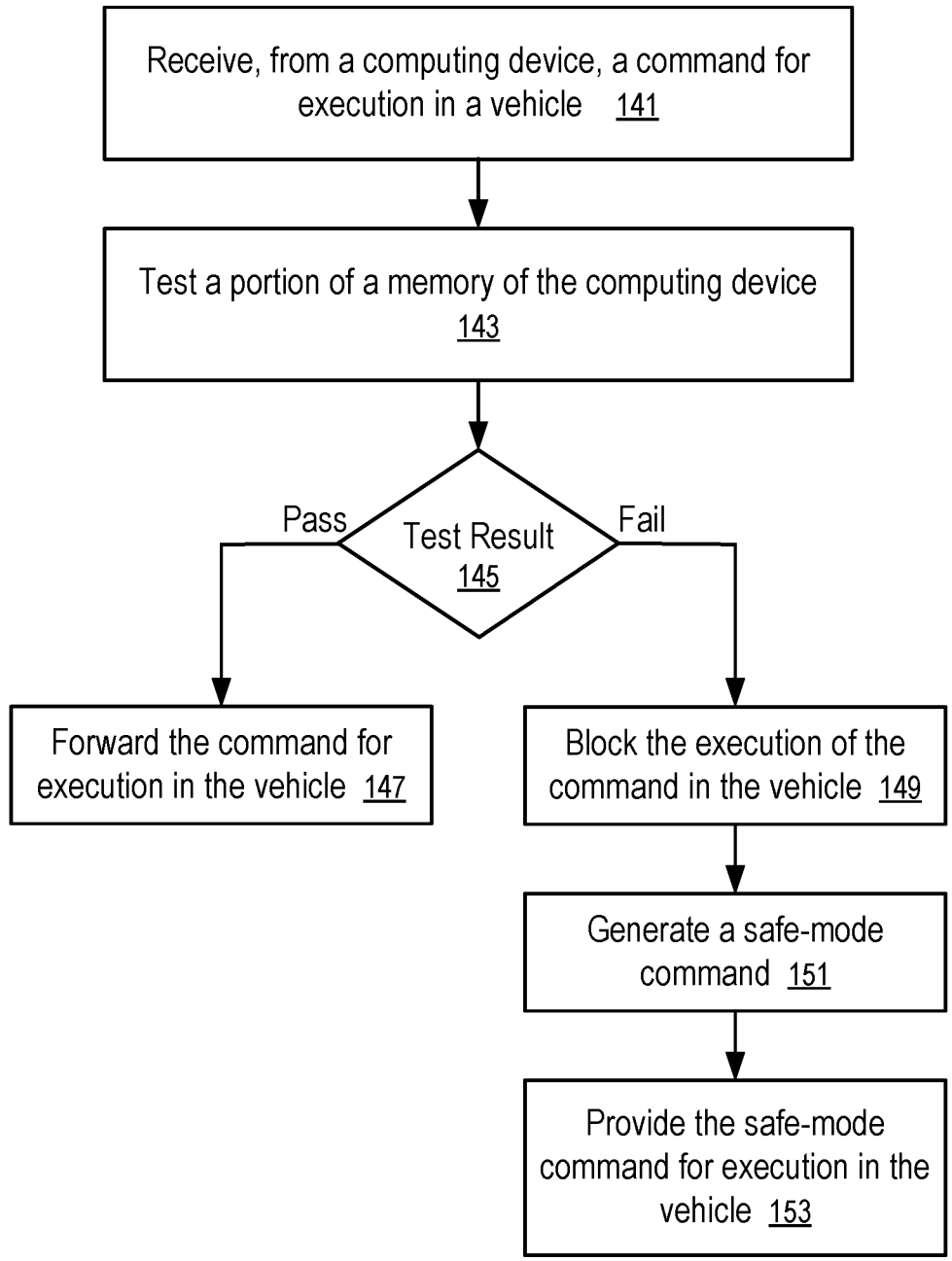
FIG. 3 shows a method to process a command from a computing device of a vehicle according to one embodiment.

FIG. 3 shows a method to process a command from a computing device of a vehicle according to one embodiment. For example, the method of FIG. 3 can be implemented in the vehicle (101) of FIG. 1 to perform operations illustrated in FIG. 2.

The method of FIG. 3 includes: receiving (141), from a computing device (e.g., SoC (105)), a command (123) for execution in a vehicle (101); testing (143) a portion (e.g., 115 and 119) of a memory (113) of the computing device (e.g., SoC (105)); determining (145) from the test result whether the memory (113) of the computing device (e.g., SoC (105) has passed the test (125) or failed the test (125); and, if it is determined (145) that the memory (113) has passed the test (125), forwarding (147) the command (123) for execution in the vehicle (101).

If it is determined (145) that the memory (113) has failed the test (125), the method of FIG. 3 further includes: blocking (149) the execution of the command (123) in the vehicle (101); generating (151) a safe-mode command; and providing (153) the safe-mode command for execution in the vehicle (101).

Figure 4:
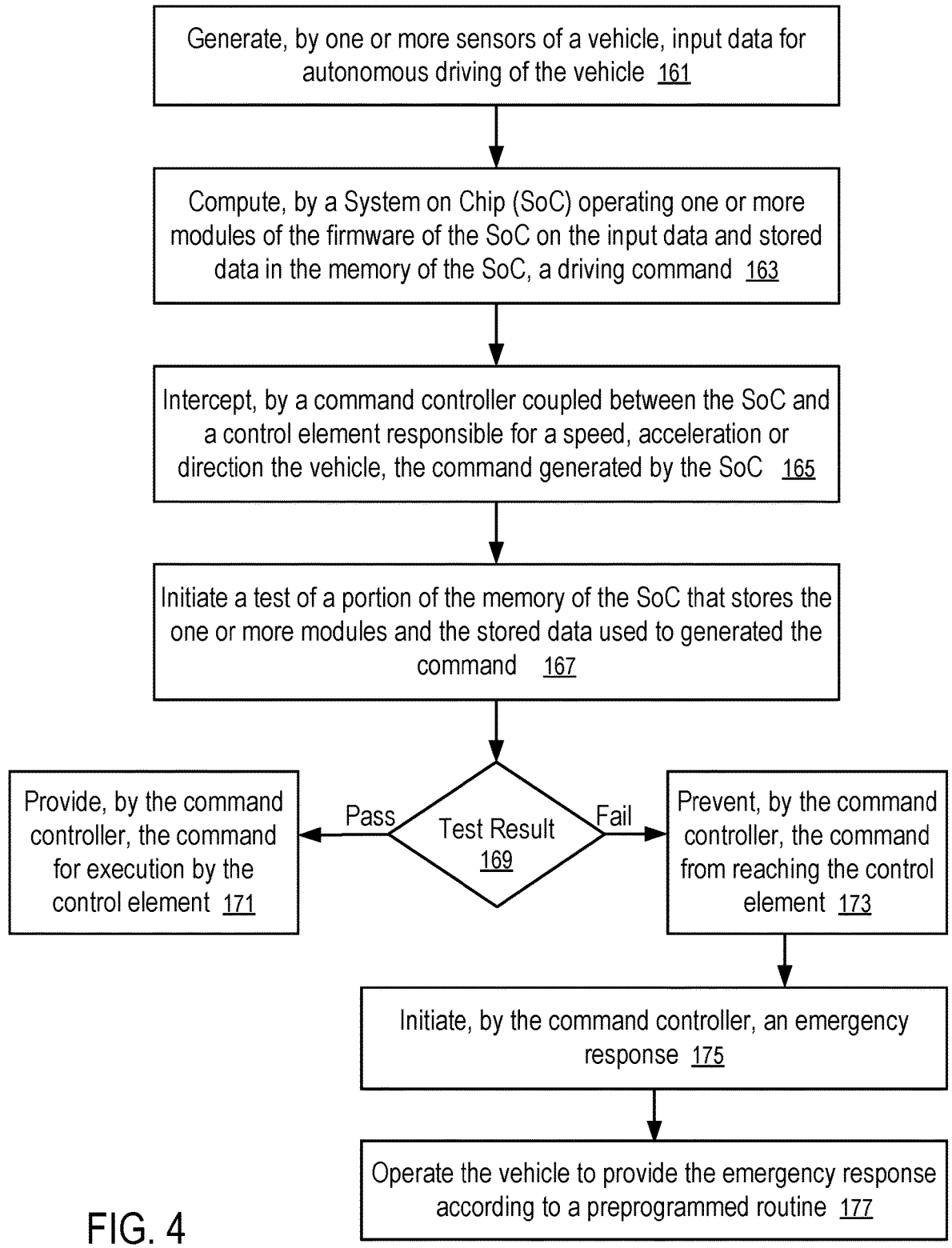
FIG. 4 shows a detailed method to enhance the reliability of a vehicle having an autonomous driving function according to one embodiment.

FIG. 4 shows a detailed method to enhance the reliability of a vehicle having an autonomous driving function according to one embodiment. For example, the method of FIG. 4 can be implemented in the vehicle (101) of FIG. 1 to perform operations illustrated in FIG. 2.

The method of FIG. 4 includes: generating (161), by one or more sensors (103) of a vehicle (101) (e.g., a visible light camera, an infrared camera, a sonar, a radar, a lidar), input data (121) for/during autonomous driving of the vehicle (101); computing (163), by a System on Chip (SoC) (105) operating one or more modules of the firmware (115) of the SoC (105) on the input data (121) and stored data (119) in the memory (113) of the SoC (105), a driving command (123); intercepting (165), by a command controller (107) coupled between the SoC (105) and a control element (109) responsible for a speed, acceleration or direction the vehicle (101) (e.g., an accelerator, a brake, a steering mechanism of the vehicle), the command (123) generated by the SoC (105); initiating (167) a test (125) of a portion of the memory (113) of the SoC (105) that stores the one or more modules and the stored data (119) used to generated the command (123); determining (145) from the test result whether the portion of the memory (113) of the computing device (e.g., SoC (105) has passed the test (125) or failed the test (125); and, if the portion of the memory (113) of the computing device (e.g., SoC (105) has passed the test (125), providing (171), by the command controller (107), the command (123) for execution by the control element (109).

If the portion of the memory (113) of the computing device (e.g., SoC (105) has failed the test (125), the method of FIG. 4 further includes: preventing (173), by the command controller (107), the command (123) from reaching the control element (109); initiating (175), by the command controller (107), an emergency response; and operating (177) the vehicle (101) to provide the emergency response according to a preprogrammed routine.

For example, the emergency response may include: requesting a human operator of the vehicle (101) to take control of the vehicle (101); starting a preprogrammed emergency response routine to place the vehicle (101) in a safe condition; and/or reducing the speed of the vehicle (101) for a stop.

In some instances, the portion of the memory (113) that is being tested (125) is identified based on a type of the command (123). Based on the type of the command (123), the command controller (107) and/or the SoC (105) identifies the modules of the firmware (115) responsible for outputting the command (123) and its associated data (119) responsible for outputting the command (123). The portion of the memory (113) being tested is identified to exclude, from the test (125), a portion of the memory (113) that is not used, or stores other data (117) that are not responsible for outputting the command (123), or stores other modules of the firmware (115) that are not responsible for outputting the command (123).

In some implementations, the command controller (107) is external to the SoC (105) that is sealed in an integrated circuit package. Alternatively, the command controller (107) may be part of the SoC (105), implemented via the processor(s) (111) executing a module of the firmware (115) and/or implemented via a hardware circuitry.

The SoC (105) may include a memory test circuitry that performs the test (125) in response to a request from the command controller (107).

In some instances, it is desirable to reduce the number of memory tests performed during the autonomous driving of the vehicle. The memory tests can be reduced via implementing redundancy in the generation of the commands for autonomous driving such that, when possible, the reliability of the autonomous driving commands is assessed based on redundancy, instead of memory tests.

For example, at least two identical SoCs (e.g., 105) can be used to process the same input data (103) to generate redundant ones of the command (123) for autonomous driving of the vehicle (101). The use of the redundant components in the vehicle (101) improves reliability of the vehicle (101) as a whole. The reliability of a command (123) generated by one SoC (105) may be examined by comparing it to the redundant command generated by another redundant SoC that is identical to the SoC (105) and that operates on the same input data (121) from the sensor(s) (103). When the commands match with each other, the command (123) generated by the SoC (105) is considered to be reliable; and thus, the command controller (107) can forward the command (123) to be executed and/or effectuated by the control element(s) (109) without the need for a memory test for the determination of the reliability of the command (123).

Typically, redundant components do not fail at the same time and/or fail in the same way. Thus, when the redundant components generate different results from the same input (121), the mismatched results are the indication of a fault, error, problem, corruption, or failure in at least one of the redundant components, which produces an unreliable result. To identify the unreliable one of the different results and/or the faulty component, a memory test (125) can be performed as discussed above in connection FIG. 2 for each of the redundant components. The redundant components can be tested in parallel. After eliminating the unreliable result generated by the faulty component, the vehicle is most likely to be still operable using one of the redundant components that is still healthy, as indicated by passing a memory test (e.g., 125). In a rare event where all of the redundant components fail their memory tests (e.g., 125), or when the memory tests (e.g., 125) fail to positively identify a faulty component, an emergency response or safe-mode command can be initiated by the command controller (107) in a way similar to those discussed above in connection with FIGS. 1-4.

Figure 5:
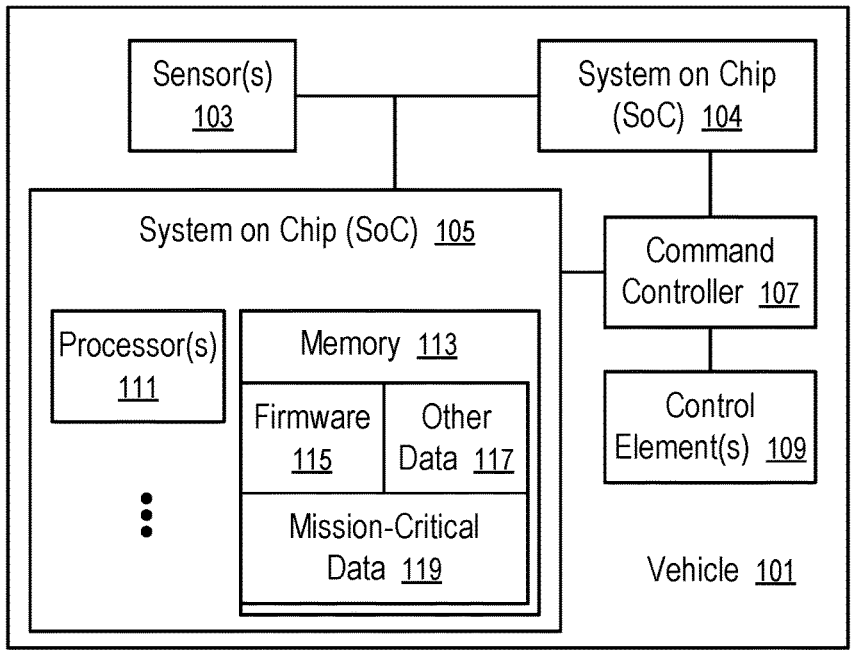
FIG. 5 shows a vehicle having redundant SoCs for generating autonomous driving commands according to one embodiment.

FIG. 5 shows a vehicle having redundant SoCs for generating autonomous driving commands according to one embodiment. For example, the vehicle (101) of FIG. 5 can be implemented by adding, in the vehicle (101) of FIG. 1, a SoC (104) that is identical to the SoC (105), or having the same function in generating a driving command for the command controller (107).

When the vehicle (101) of FIG. 5 has redundant components (104 and 105), the use of the redundant components (104 and 105) improves the reliability of the vehicle (101) as a whole. For example, if one of the SoCs (104 and 105) fails completely (e.g., no longer generating outputs to the command controller (107)), the autonomous driving of the vehicle (101) can still function as intended using the remaining one of the SoCs (104 or 105).

In FIG. 5, both SoCs (104 and 105) receive the same input data from the sensor(s) (103) and be configured to process the input data in the same way, by the processor(s) (111) running the relevant modules of the firmware (115) in accordance with the mission-critical data (119) to process the inputs from the sensor(s) (103). When both SoCs (104 and 105) are healthy, the SoCs (104 and 105) produce identical, or substantially the same, outputs to the command controller (107).

When the SoCs (104 and 105) produce the same output to the command controller (107), it can be assumed that both SoCs (104 and 105) are healthy and the outputs of the SoCs (104 and 105) are reliable. As a result, the command controller (107) can skip memory tests that are designed to test the reliability of the outputs of the SoCs (104 and 105).

However, one of the SoCs (104 and 105) may have a fault, error, problem, corruption, or failure that causes the faulty SoCs (104 or 105) to generate an unreliable, faulty, or erroneous output. When the outputs of the SoC (104 and 105) are different, it can be inferred that at least one of the SoC (104 and 105) is defective.

In some instances, it may be possible for the command controller (107) to determine which of the SoCs (104 and 105) is defective based on examining the outputs generated by the SoCs (104 and 105).

For example, when one of the SoCs (104 and 105) fails to provide an output, the SoC (104 or 105) that fails to generate an output is defective.

For example, when one of the SoCs (104 and 105) provides an output that is out of an expected range, the SoC (104 or 105) that generates the out of range output is defective.

For example, in view of the previous outputs, when one of the SoCs (104 and 105) provides an output that does not agree with a predetermined pattern, the SoC (104 or 105) generating the output that is in conflict with the predetermined pattern is defective.

However, in many instances, the command controller (107) may not be able to tell which of the SoC (104 and 105) is defective, based on the analyses of the outputs of the SoCs (104 and 105). In other instances, detailed analyses of the outputs of the SoCs (104 and 105) to identify a faulty one within the outputs may take a time period longer a threshold safe for autonomous driving and/or longer than the time period for performing a memory test.

Thus, when the command controller (107) receives different commands or control signals from the SoCs (104 and 105), the command controller (107) may initiate memory tests on both SoCs (104 and 105) in parallel to identify one of the SoCs (104 and 105) that has faulty memory (e.g., 113) that is responsible, at least in part, for the generation of a corresponding faulty command or control signal.

The memory test performed on each of the SoCs (104 and 105) is configured to determine the reliability of the respective SoC (104 or 105). If the SoC (104 or 105) fails the memory test, its output to the command controller (107) is unreliable and thus can be discarded.

The command controller (107) may perform the same memory test on both SoCs (104 and 105). For example, the command controller (107) may test selected memory blocks having the same physical addresses (or logical addresses) within the SoCs (104 and 105), regardless of whether the tested memory blocks are configured to store the same content. For example, the command controller (107) may test selected memory blocks that store the same content (e.g., same modules of the firmware (115) and same mission-critical data (119)) within the SoCs (104 and 105), even though the memory blocks corresponding to different physical and/or logical addresses within the different SoCs (104 and 105).

Alternatively, the command controller (107) may test the SoCs (104 and 105) differently. For example, the command controller may randomly select a portion of the memory (113) of the SoC (105) for testing and randomly selection another portion of the memory of SoC (104) for testing, where the selected memory portions of the SoCs (104 and 105) may have not any apparent relations. In some instances, the command controller (107) may randomly test portions of the memories of the SoCs (104 and 105) until one of the SoCs (104 and 105) fails its test, or entire memories of the SoCs (104 and 105) pass their tests.

Optionally, the SoCs (104 and 105) are identical in hardware and in stored content. For example, the SoCs (104 and 105) not only store the same firmware (115) at the same location within their memories (e.g., 113), but also store the same mission-critical data (119) at the same location within their memories (e.g., 113). When healthy, the SoCs (104 and 105) may be indistinguishable from each other and are interchangeable.

Alternatively, the usage of the SoCs (104 and 105) in the vehicle may be different in some aspects. For example, the memories (e.g., 113) of the different SoCs (104 and 105) may be used to store different other data (117). For example, the firmware (115) and/or the mission-critical data (119) may be stored at different locations within the memories (e.g., 113) of the different SoCs (104 and 105).

In some implementations, the SoCs (104 and 105) may not be identical in hardware. For example, aside from the SoCs (104 and 105) being configured to produce the same output for the command controller (107) based on the same input from the sensor(s) (103), the SoC (104 and 105) may have other functions. For example, the SoC (104 and 105) may have different circuits for their identification. For example, the SoC (104) may include a self-diagnosis circuitry or module which is absent from the SoC (105). For example, the SoCs (104 and 105) may have different implementations resulting in different trade-offs in hardware cost and performance (e.g., in computation speed, durability, reliability). For example, the SoC (104) is configured to provide a redundant function of the SoC (105) in generating outputs to the command controller (107) but may have other functions not found in SoC (105) and may not have some functions found in SoC (105).

Figure 6:
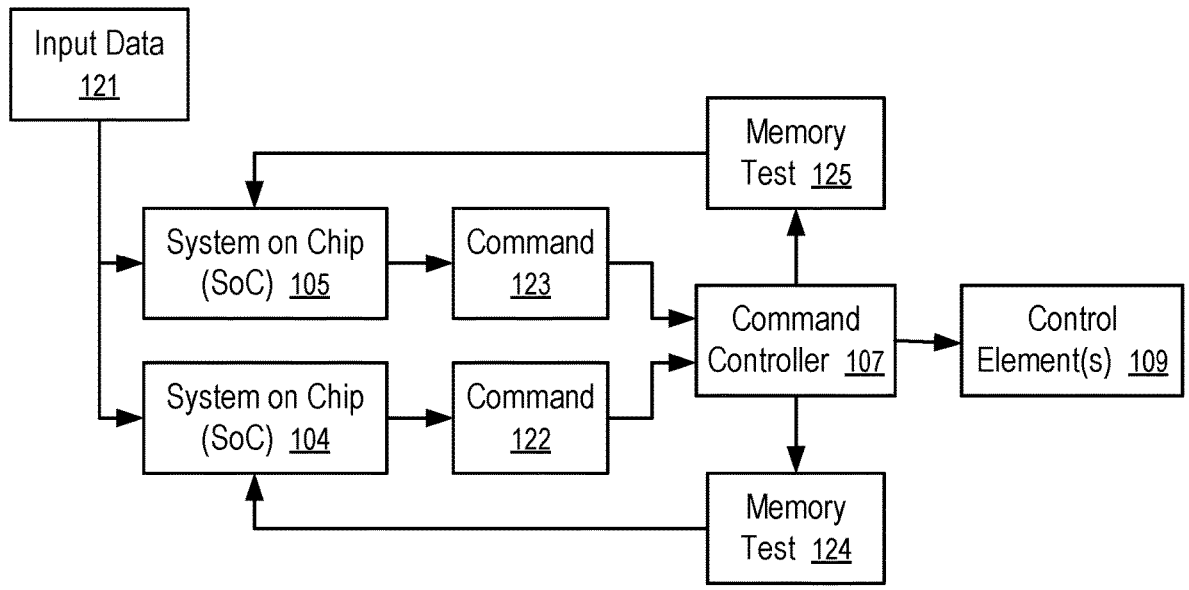
FIG. 6 illustrates the operations of a command controller to check the reliability of commands from redundant computing devices of a vehicle according to one embodiment.

FIG. 6 illustrates the operations of a command controller to check the reliability of commands from redundant computing devices of a vehicle according to one embodiment. For example, the operations illustrated in FIG. 6 can be implemented in a vehicle (101) illustrated in FIG. 5 or in another system.

In FIG. 6, both the SoCs (104 and 105) receives the same input data (121) to generate respective commands (122 and 123) that affect or control the operation of the control element(s) (109) for the autonomous driving of the vehicle (101).

The command controller (107) intercepts the commands (122 and 123) on the communication path from the SoCs (104 and 105) to the control element(s) (109).

In response to such commands (122 and 123), the command controller (107) compare the commands (122 and 123).

If the commands (122 and 123) are the same, or have a parameter difference that is less than a predetermined threshold, the command controller (107) skips memory tests (124 and 125) that are designed to test the reliability of the commands (122 and 123). The match in the commands (122 and 123) is considered an indication of reliability of both of the commands (122 and 123).

If the commands (122 and 123) are different, or have a parameter difference that is more than the predetermined threshold, the command controller (107) generates, initiates, or requests the memory tests (124 and 125) that are designed to test the reliability of the commands (122 and 123). The mismatch in the commands (122 and 123) is considered an indication of unreliability in at least one of the commands (122 and 123). The memory tests (122 and 123) are used to identify an unreliable one of the commands (122 and 123) that is from one of the SoCs (105 and 104) that fails the corresponding memory test (e.g., 124 or 125). Each of the memory tests (122 and 123) can be constructed and/or performed in a way similar to the memory test (123) of FIG. 2.

The command controller (107) is configured to discard the command (e.g., 122 or 123) corresponding to the SoC (e.g., 104 or 105) that fails the memory test (e.g., 124 or 125).

If there is one command (e.g., 123 or 122) that is not discarded after the memory tests (124 and 125), this remaining command (e.g., 123 or 122) is provided by the command controller (107) to the control element(s) (109) for execution, in a way similar to the command control (109) of FIG. 2 passing the command (123) to the command element(s) (109) in response to the SoC (105) passing the memory test (125) in FIG. 2.

Further, the command controller (109) may attempt to restore the redundant function of the faulty one of the SoCs (104 and 105) using the data from the healthy one of the SoCs (104 and 105) that passes the memory test (e.g., 124 or 125).

For example, the firmware (115) and/or the mission-critical data (119) stored in the memory (113) of the faulty SoC (105) may be moved to a different location within the memory (113) of the SoC (105). Since the memory (113) at the new location for storing the firmware (115) and/or the mission-critical data (119) may still function correctly, the error caused by the failed memory elements within the SoC (105) can be corrected. The faulty part of the memory (113), as identified by the result of the memory test (e.g., 125), may be blocked from further usage. The corrupted data in the faulty part of the memory (113) can be retrieved from the healthy one of the SoCs (e.g., 104) for repair. After restoring the firmware (115) and/or the mission-critical data (119) at a new location in the memory (113) of the SoC (105) that has faulty memory elements, the subsequent commands (122 and 123) generated by the SoCs (104 and 105) can be further compared to determine whether the repair is successful. For example, if the subsequent commands (122 and 123) generated by the SoCs (104 and 105) agree with each other, the redundant functions of the SoCs (104 and 105) can be considered to have been restored.

If, in a rare situation, both of the mismatching commands (122 and 123) are discarded after the memory tests (124 and 125), none of the command (e.g., 123 or 122) is provided to the control element(s) (109); and the command controller (107) may initiate a safe-mode command or an emergency response, in a way similar to the command control (109) of FIG. 2 responding to the blocking of the command (123) from reaching the control element (109) after the SoC (105) fails the memory test (125) in FIG. 2.

If, in a rare situation, none of the mismatching commands (122 and 123) is discarded after the memory tests (124 and 125), the command controller (107) may block both commands (e.g., 122 and 123) as a safety precaution and initiate the safe-mode command or an emergency response, in a way similar to the situation where both SoCs (104 and 105) fail the memory tests (124 and 125).

Alternatively, when none of the mismatching commands (122 and 123) is discarded after the memory tests (124 and 125), the command controller (107) may change or expand the scope of the memory tests (124 and 125); and the memory tests (124 and 125) can be adjusted repeatedly until at least one of the SoCs (104 or 105) fails its test (e.g., 124 or 125) or all of the memories of the SoCs (104 or 105) are found to be functioning properly. In some instances, the command controller (107) may optionally further test the processor(s) (e.g., 111) of the SoCs (104 and 105) within a predetermined time period that is safe for autonomous driving. For example, the command controller (107) may request each of the SoCs (104 and 105) to run a self-diagnosis to determine an unreliable one of the SoCs (104 and 105). For example, the command controller (107) may provide sample data as a replacement of the input data (121) to obtain the commands (122 and 123) can comparing the commands with the expected command associated with the sample data. A SoC (104 or 105) that produces a command (122 or 123) from the sample data that does not agree with the expected command is identified as a malfunctioning component.

Figure 7:
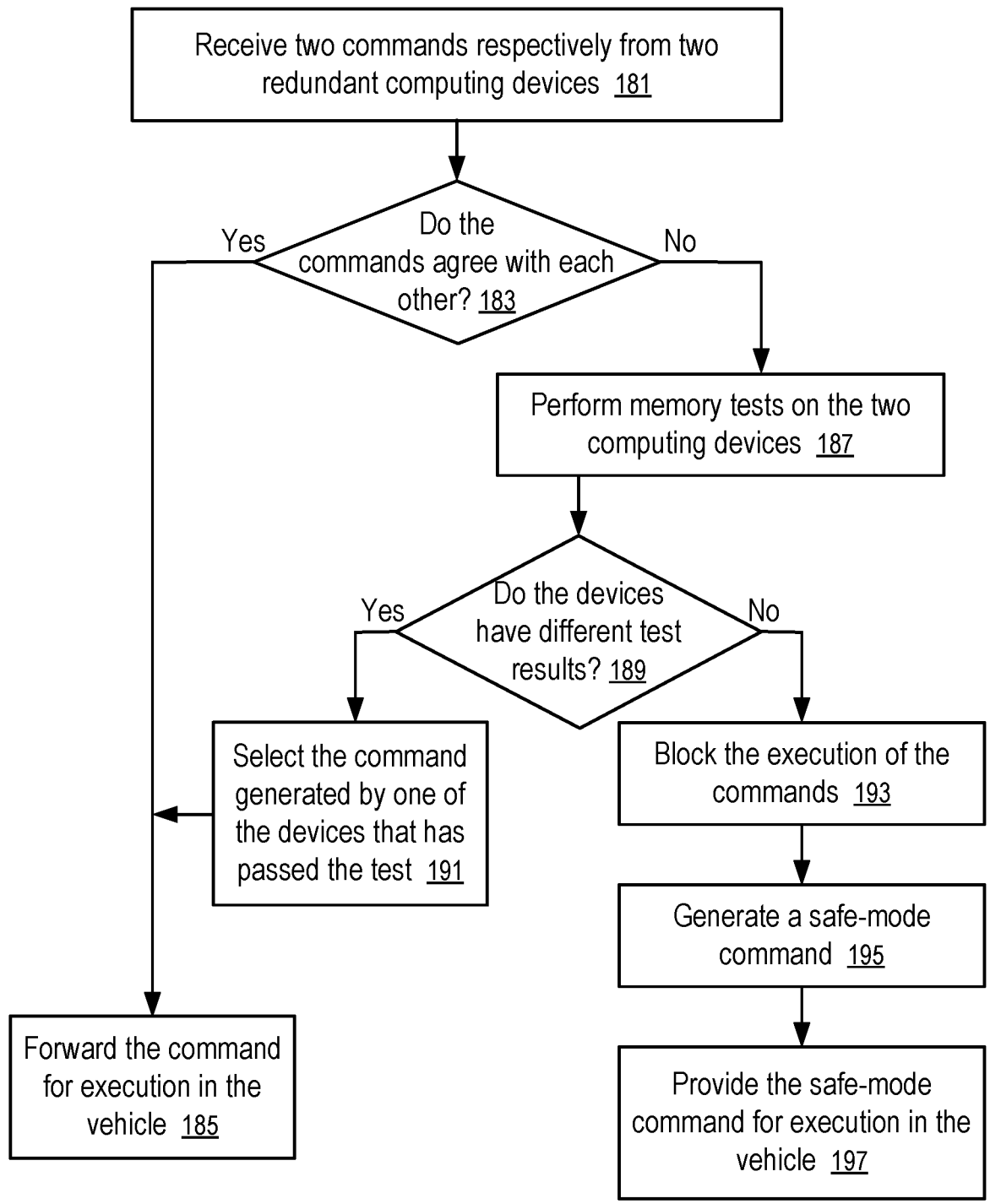
FIG. 7 shows a method to process redundant commands for a vehicle according to one embodiment.

FIG. 7 shows a method to process redundant commands for a vehicle according to one embodiment. For example, the method of FIG. 7 can be implemented in the vehicle (101) of FIG. 5 to perform operations illustrated in FIG. 6.

The method of FIG. 7 includes: receiving (181) two commands (122 and 123) respectively from two redundant computing devices (such as SoCs (104 and 105)); determining (183) whether the commands (122 and 123) received from the redundant computing devices (104 and 105) agree with each other; and if so, forwarding (185) any of the commands (122 and 123) for execution in the vehicle (101).

If it is determined (183) that the commands (122 and 123) do not agree with each other, the method of FIG. 7 further includes: performing (187) memory tests (124 and 125) on the two computing devices (104 and 105); determining (189) whether the computing devices (104 and 105) have different test results; if so (e.g., one passes the memory tests (e.g., 124 or 125) and other fails the memory test (e.g., 125 or 124)), selecting (191) the command (e.g., 122 or 123) generated by one of the computing devices (104 and 105) that has passed the memory test (e.g., 124 or 125); and forwarding (185) the selected command (e.g., 122 or 123) generated by the computing device (e.g., 104 or 105) that has passed the memory test (e.g., 124 or 125) for execution in the vehicle (101).

If it is determined (189) that the computing devices (104 and 105) have the same test result (e.g., both pass the memory tests (124 and 125) or both fail the memory test (124 and 125)), the method of FIG. 7 further includes:

blocking (193) the execution of the commands (122 and 123); generating (195) a safe-mode command; providing (197) the safe-mode command for execution in the vehicle (101) (e.g., in a way similar to the corresponding operations (149, 151 and 153) of FIG. 3).

Figure 8:
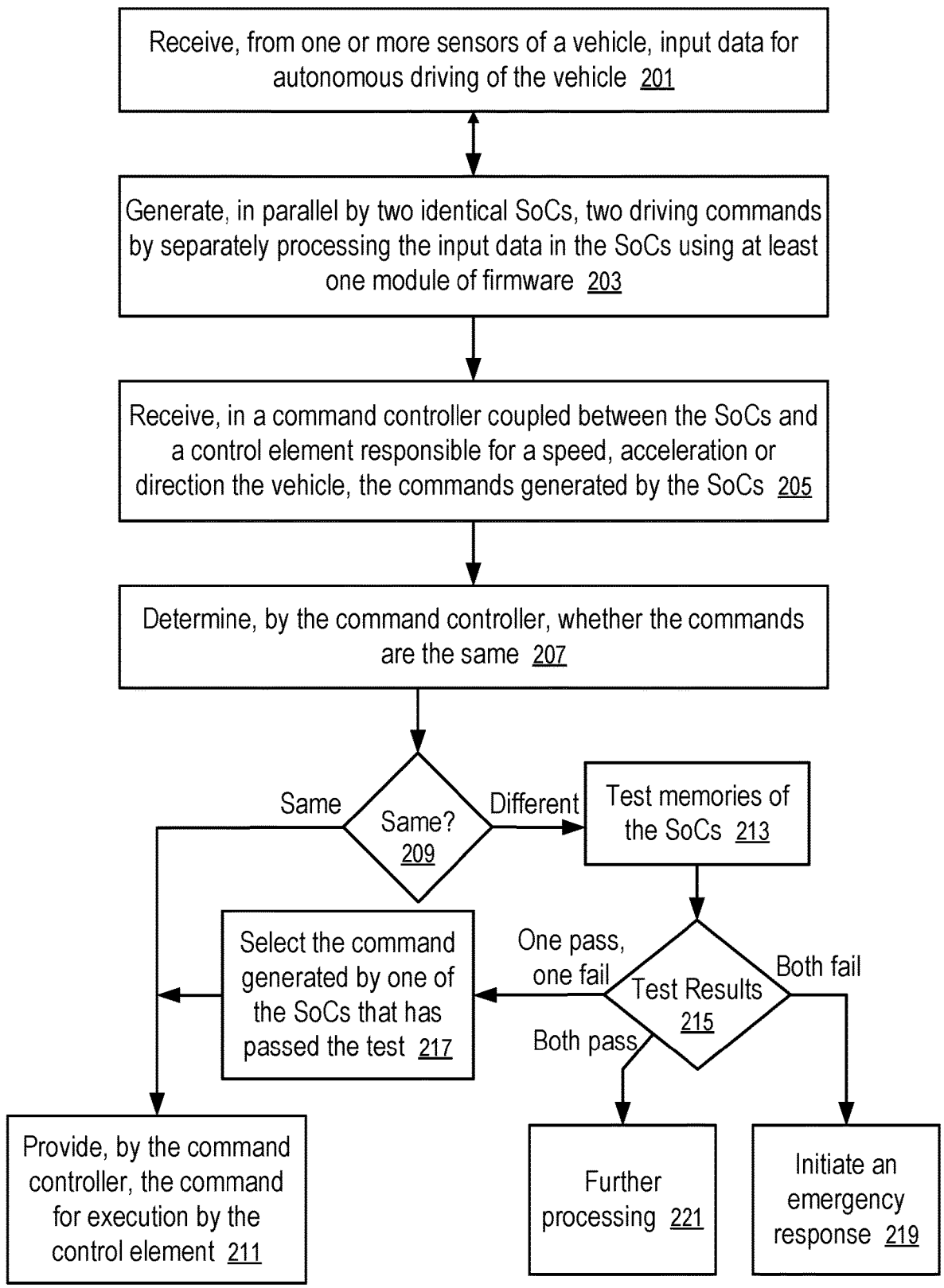
FIG. 8 shows a detailed method to enhance the reliability of a vehicle having redundant autonomous driving functions according to one embodiment.

FIG. 8 shows a detailed method to enhance the reliability of a vehicle having redundant autonomous driving functions according to one embodiment. For example, the method of FIG. 8 can be implemented in the vehicle (101) of FIG. 5 to perform operations illustrated in FIG. 6.

The method of FIG. 8 includes: receiving (201), from one or more sensors (103) of a vehicle (101), input data for autonomous driving of the vehicle (101); generating (203), in parallel by two identical SoCs (104 and 105), two driving commands (122 and 123) by separately processing the input data (121) in the SoCs (104 and 105) using at least one module of firmware (115) and mission-critical data (119) stored in the SoCs (104 and 105); receiving (205), in a command controller (107) coupled between the SoCs (104 and 105) and a control element (109) responsible for a speed, acceleration or direction the vehicle (101) (e.g., an accelerator, a brake, or a steering mechanism of the vehicle (101)), the commands (122 and 123) generated by the SoCs (104 and 105); determining (207), by the command controller (107), whether the commands (122 and 123) are the same; and if (209) the commands (122 and 123) are the same, providing (211), by the command controller (107), the command (122 or 123) from any of the SoCs (104 and 105) for execution by the control element (109).

If (209) the commands (122 and 123) are different, the method of FIG. 8 further includes: testing (213) memories (e.g., 113) of the SoCs (104 and 105); and making (215) a decision based on the test results.

If (215) one of the memory tests (124 and 125) has a result of pass and the one of the memory tests (124 and 125) has a result of fail, the method of FIG. 8 further includes: selecting (217) the command generated by one of the SoCs (e.g., 104 or 105) that has passed the memory test (e.g., 124 or 125); and providing (211), by the command controller (107), the command (122 or 123) from the SoC (e.g., 104 or 105) that has passed the memory test (e.g., 124 or 125) for execution by the control element (109).

Optionally, the data stored in the healthy SoC (e.g., 104) that has passed the memory test (124) is copied into the memory (113) of the unhealthy SoC (e.g., 105) that has failed the memory test (125) to repair the unhealthy SoC (e.g., 105). The data is copied into an alternative area of the memory (113) of the unhealthy SoC (e.g., 105), different from the tested area that has failed the memory test (125), to replace the corrupted data previously stored in the tested area of the unhealthy SoC (e.g., 105). Thus, if the damage in the unhealthy SoC (e.g., 105) is limited to the data corruption in the tested area of the unhealthy SoC (e.g., 105), copying data from the healthy SoC (e.g., 104) into an alternative area of the memory (113) of the unhealthy SoC (e.g., 105) can restore the function of the unhealthy SoC (e.g., 105). Whether or not the function of the unhealthy SoC (e.g., 105) is successfully restoration can be examined via comparing the subsequent commands from the SoCs (104 and 105). If the subsequent commands from the different SoCs (104 and 105) match with each other, the restoration is successfully.

If (215) both the memory tests (124 and 125) have the result of fail, the method of FIG. 8 further includes: initiating (219) an emergency response, in a way similar to the operations (175 and 177) of FIG. 4.

If (215) both the memory tests (124 and 125) have the result of pass, the method of FIG. 8 further includes: performing (221) further processing, such as expanding the memory tests (124, 125), testing the processors of the SoCs (105), requesting self-diagnosis of the SoCs (104 and 105), blocking the mismatched commands (122 and 123), and/or initiating an emergency response similar to the operations (175 and 177) of FIG. 4.

When the commands generated by the redundant SoCs do not match with each other, a voting mechanism can be used to identify a reliable command produced by a subset of redundant SoCs, reducing or eliminating the need for memory tests and/or diagnoses.

For example, when more than two redundant SoCs are used to generate three or more redundant outputs, a subset of the healthy SoCs can produce matching outputs even when one or more faulty SoCs produce different outputs. Thus, the matching outputs can be identified as the reliable output.

For example, when one of the redundant SoCs is faulty, its output does not agree with the outputs of the remaining two or more healthy SoCs. The probability of the single mismatched output being produced by a faulty SoC and the multiple matching outputs being produced by healthy SoCs are significantly higher than the probability of the single mismatched output being produced by a healthy SoC and the multiple matching outputs being produced by faulty SoCs. When the SoCs produce a single mismatched output and multiple matching outputs, it can be assumed that what is being observed is a large probability event, instead of a small probability event. As a result, it can be inferred that the multiple matching outputs are produced by multiple healthy SoCs and the single mismatched output is produced by a single faulty SoC. Based on such an inference, any of the matching outputs generated by the two or more healthy SoCs can be identified as a reliable command for execution in the vehicle without a need to perform memory tests, even though the SoCs as a whole produce outputs that do not all agree with each other. In general, a voting mechanism can be used to identify a large probability scenario, as further discussed below.

Figure 9:
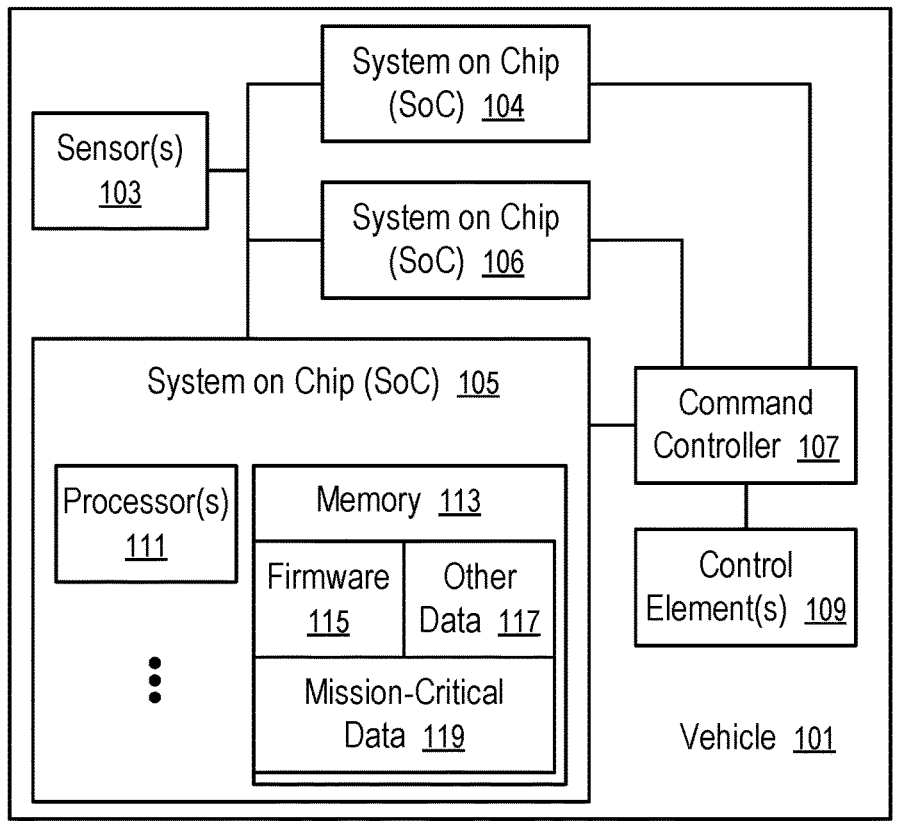
FIG. 9 shows a vehicle having a command controller that implements a voting mechanism to evaluate reliability of redundant autonomous driving commands according to one embodiment.

FIG. 9 shows a vehicle having a command controller that implements a voting mechanism to evaluate reliability of redundant autonomous driving commands according to one embodiment.

The vehicle (101) of FIG. 9 can be implemented, for example, by adding in the vehicle (101) of FIG. 5 a further SoC (106) that has the redundant function of SoCs (104 and 105) in generating redundant outputs to the command controller (107) based on the data from the sensor(s) (103) for autonomous driving.

The additional SoC (106) may be identical to SoC (104) and/or SoC (105) in hardware, firmware, and stored data. For example, the firmware (115) the mission-critical data (119), the other data (117) may be stored in the memory (113) of each of the SoCs (104, 105, and 106) in an identical manner.

Alternatively, the additional SoC (106) may be different from the SoC (104) and/or the SoC (105) in hardware, firmware and/or stored data.

For example, the SoCs (104, 105, and 106) may store different other data (117).

For example, the additional SoC (106) may have an identification circuit that is different from the SoC (104) and/or the SoC (105).

For example, the SoC (106) may include a self-diagnosis circuitry or firmware module which is absent from the SoC (105) and/or the SoC (104).

For example, the SoCs (104, 105, and 106) may have different hardware implementations to balance cost and performance (e.g., performance in computation speed, durability, reliability).

For example, the SoC (106) may lack certain functions or firmware modules that can be found in the SoC (104) and/or the SoC (105).

However, the SoCs (104, 105, and 106) of the vehicle (101) are configured to at least provide a same function in producing the output to the command controller (107) using the data received from the sensors (103).

In generate, the configuration of three or more redundant SoCs (e.g., 104, 105, 106) in the vehicle (101) allows the use of a voting mechanism in the command controller (107) to elect a reliable one of the outputs generated by SoCs (e.g., 104, 105, 106).

When the outputs of two or more of the redundant SoCs (e.g., 104, 105, and/or 106) to the command controller (107) agree with each other, the two or more redundant SoCs (e.g., 104, 105, and/or 106) that produce the matching outputs are considered to vote for an output candidate representing the matching outputs. If the outputs of two SoCs (e.g., 104, 105, and/or 106) do not agree with each other, the SoCs (e.g., 104, 105, and/or 106) having the mismatched outputs do not vote for any of the candidates representing the different outputs. The candidate having the most votes represents the matching outputs from the largest subset of, if not all of, the outputs of the redundant SoCs (104, 105, and 106) configured in the vehicle (101). Since the probability that the largest subset of SoCs (e.g., 104, 105, 106) producing the matching outputs are healthy is significantly higher than the probability of other scenarios corresponding to the same voting result, the winning candidate representing in the matching outputs can be forwarded to the control element(s) (109) for autonomous driving of the vehicle (101).

For example, when three redundant SoCs (104, 105 and 106) are configured in the vehicle (101), the outputs provided by the SoCs (104, 105 and 106) to the command controller (107) may all agree with each other. In such a situation, the SoCs (104, 105 and 106) all vote for the same candidate. The probability of the SoCs (104, 105 and 106) being all faulty but still creating the same matching outputs is extremely low, especially before any faulty one of the SoCs (104, 105 and 106) is detected prior to the time instance when the SoCs (104, 105 and 106) all become faulty in the same way to produce the matching but erroneous outputs. The probability of the SoCs (104, 105 and 106) being all healthy to produce matching outputs is significantly higher than the probability of the SoCs (104, 105 and 106) being all faulty but still producing matching outputs. As a result, the probability of the candidate being erroneous is negligible; and the probability of the candidate being correct is significantly higher than the probability of the candidate being erroneous. Thus, when all of the SoCs (104, 105 and 106) vote for the same candidate that represent the same or matching outputs of the SoCs (104, 105 and 106), it can be inferred that: the SoCs (104, 105 and 106) are all healthy for producing the matching outputs; and the candidate voted for by the redundant SoCs (104, 105 and 106) is sufficiently reliable for execution by the control element(s) (109) during autonomous driving.

When no less than a threshold number of the SoCs (104, 105, and 106) configured in the vehicle (101), such as the SoCs (104 and 106), generate matching outputs and the remaining SoC(s), such as the SoC (105), generate a different output, there are several possible scenarios relevant to the health statuses of the SoCs (104, 105, 106). Under the condition that the SoCs (104 and 106) generate matching outputs and the SoC (105) generates a mismatched output, there is one possible scenario where the SoCs (104 and 106) are healthy, but the SoC (105) is faulty. In another possible scenario, the SoCs (104 and 106) are unhealthy, but the SoC (105) is healthy. In a further possible scenario, all of the SoCs (104, 105 and 106) are unhealthy. However, it can be determined that the scenario of the SoCs (104 and 106) being healthy and the SoC (105) being unhealthy has the highest probability; and the combined probability of other scenarios is negligible and/or below a threshold probability. Thus, when there are the threshold number (e.g., two) of SoCs (104, 105, and 106) in the vehicle (101), such as SoCs (104 and 106), voting for a candidate by generating matching outputs, the command controller (107) is configured to conclude that: the SoCs (104 and 106) generating the matching outputs are healthy; the SoC (105) generating the mismatched output is faulty; and the candidate represented by the matching outputs of the SoCs (104 and 106) can be provided to the control element(s) (109) for the autonomous driving of the vehicle (101).

During the matching of the outputs of the SoCs (104, 105, and 106) with each other, the command controller (107) may find a threshold number (e.g., two) of the SoCs (104, 105, and 106) agree with each other, before the completion of comparing all of the outputs of the SoCs (104, 105, and 106). In such a situation, the command controller (107) may forward, to the control element(s) (109), the candidate representing the matching outputs (e.g., produced by the SoCs (104 and 106)), before determining whether the candidate matches with and/or agrees with the remaining output(s) (e.g., the output produced by the SoC (105)).

After forwarding the winning candidate (e.g., representing the outputs from the SoCs (104 and 106)) to the control element (109), the command controller (107) may optionally skip the determination whether the candidate agrees with the remaining output(s) (e.g., the output generated by the SoC (105)), or optionally further determine whether the candidate agrees with the remaining output(s) (e.g., the output generated by the SoC (105)) in order to determine the health status of the remaining SoC(s) (e.g., 105). If the winning candidate does not match with an output of the remaining SoC(s), such as the output generated by the SoC (105), the command controller (107) identifies the remaining SoC(s), such as the SoC (105), as being faulty for generating a mismatched output.

Once it is inferred that the SoC (105) is unhealthy for producing an output that does not agree with the winning candidate, the command controller (107) may perform operations to restore the function of the unhealthy SoC (105) while relying upon the healthy SoCs (104 and 106) for continuing operations in autonomous driving of the vehicle (101). The repair operations have little or no impact in the autonomous driving performance of the vehicle (101).

For example, the command controller (107) may test the memory (113) of the unhealthy SoC (105), section by section, to detect a faulty section of the memory (113) of the unhealthy SoC (105). The test may be performed by comparing the memory content retrieved from the unhealthy SoC (105) and the corresponding content retrieved from the healthy SoC (104 or 106), such as the firmware (115), and/or the mission-critical data (119). If a faulty memory section is detected or a corrupted data item is identified in the unhealthy SoC (105), the content from the healthy SoC (104 or 106) can be copied to a healthy section of the memory (113) of the unhealthy SoC (105) to implement the repair.

Alternatively or in combination, the command controller (107) may request the unhealthy SoC (105) to perform a self-diagnosis to identify a fault in the SoC (105).

Alternatively or in combination, the command controller (107) may communicate with the unhealthy SoC (105) to test the processor(s) (111) of the unhealthy SoC (105).

For example, the command controller (107) may request the unhealthy SoC (105) to run test routines and compare its computing results with predetermined results for the testing of the functions of the processors (111).

For example, the command controller (107) may request the unhealthy SoC (105) and one of the healthy SoCs, such as SoC (104), to run test same routines to compare their results.

When there is no match in the outputs of the SoCs (104, 105 and 106) and/or there is no winning candidate for the control element(s) (109), it is possible that the SoCs (104, 105 and 106) are all unhealthy in one scenario, and that in another scenario one of the SoCs (104, 105, and 106) is healthy but the other two are unhealthy. In such a situation when a reliable output cannot be selected based on comparing the outputs and/or via the voting mechanism, the command controller (107) may perform tests to positively identify faulty ones of the SoCs (104, 105, and 106) in order to identify a reliable output, in a way similar to the command controller (107) selecting an output for the control element (109) in FIG. 5 or 6 when the SoCs (104 and 105) in FIG. 5 or 6 produce results that do not match with each other. In such a situation, it can be inferred that at least two of the SoCs (104, 105 and 106) are unhealthy, which has an occurrence probability significantly smaller than no more than one of the SoCs (104, 105 and 106) being unhealthy. Thus, the likelihood of the vehicle (101) of FIG. 9 having a need to perform memory tests is significantly lower than the vehicle (101) of FIG. 5.

Optionally, when the mismatching in the outputs of the SoCs (104, 105 and 106) indicates that there is a high probability that more than a threshold number of SoCs (104, 105 and 106) are faulty, the command controller (107) generates an emergency response, such as communicating with a remote server separate from the vehicle (101) for assistance in computing a driving command, requesting a human operator of the vehicle (101) to take control of the vehicle (101), starting a preprogrammed emergency response routine to place the vehicle (101) in a safe condition, and/or reducing the speed of the vehicle (101) for a stop.

Figure 10:
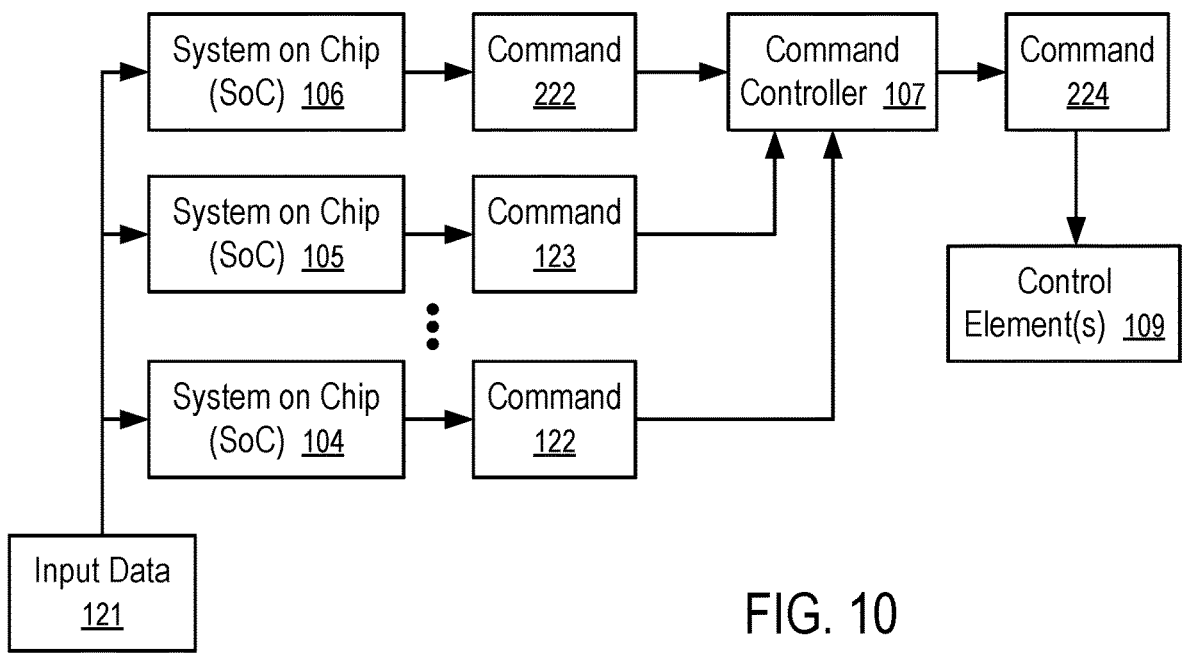
FIG. 10 illustrates a command controller combining redundant commands to output a reliable command for autonomous driving of a vehicle according to one embodiment.

FIG. 10 illustrates a command controller combining redundant commands to output a reliable command for autonomous driving of a vehicle according to one embodiment. For example, the operations of the command controller of FIG. 10 can be implemented in a vehicle (101) illustrated in FIG. 9 or in another system.

In FIG. 10, the command controller (107) receives at least three redundant commands (222, 123, . . . , 122) that are generated respectively by redundant SoCs (106, 105, . . . , 104) using the same input data (121) (e.g., from the sensor(s) (103) and/or from other computing devices of the vehicle (101)).

Based on the input commands (222, 123, . . . , 122), the command controller (107) generates an output command (224) for execution by the control command (109).

The command controller (107) tallies the votes according to the input commands (222, 123, . . . , 122). Each of the input command (222, 123, . . . , 122) can be considered as a candidate for the output command (224). When an input command (222, 123, . . . , or 122) matches with a candidate (e.g., the same as the candidate, or having a difference that is within a predetermined range), the input command (222, 123, . . . , or 122) is considered a vote for the candidate. Matching candidates are consolidated; and a winning candidate is provided as the output command (224). The winning candidate can be selected in response to a determination that it has more votes than other candidates, and/or the vote count of the winning candidate is above a threshold (e.g., more than half of the number of the SoCs (106, 105, . . . , 104).

When the set of SoCs (106, 105, . . . , 104) configured in the vehicle (101) has one or more faults, the scenario having the highest probability is that the commands (e.g., 222, 123, . . . , and/or 122) produced by a subset of the SoCs (106, 105, . . . , 104) match with each other as a candidate for the output command (224) and the remaining one or more commands do not match with each other and do not agree with the candidate. In such a scenario, the command controller (107) is configured to conclude that: the candidate corresponding to the matching commands (e.g., 222, 123, . . . , and/or 122) is reliable for winning the most votes; the SoCs (e.g., 106, 105, . . . , and/or 104) in the subset of SoCs are healthy for producing outputs agreeing with the winning candidate; and the remaining one or more SoCs have faults for producing outputs that do not agree with the winning candidate. The winning candidate is provided by the command controller (107) as the output command (224).

When the command controller (107) determines that the majority of the SoCs (106, 105, . . . , 104) votes for a candidate for the command (224), the command controller (107) may provide the winning candidate as the output command (224) without further determining whether the commands generated by the remaining one or more SoCs match with the majority.

Optionally, after providing the winning candidate as the output command (224), the command controller (107) further compares the remaining one or more commands with the winning candidate to determine whether any of the SoCs is faulty, where a faulty SoC is identified for producing a command that does not agree with the output command (224).

In a rare situation where two subsets of the SoCs (106, 105, . . . , 104) have the same highest votes for two different candidates respectively, at least one of the subset is faulty. In such a scenario, the command controller (107) may test the SoCs to positively identify a faulty subset. For example, the memory tests, similar to the tests (124 and 125) of FIG. 6, can be performed; and a subset that fails a test is faulty.

The memory tests can be performed for subsets in parallel to reduce the time period to reach the test results. Further, the memory tests for the SoCs of the same subset that vote for a same candidate can be configured to have different test scopes to reduce the test time and/or to increase the likelihood to catch the fault in the tests.

In an even rare situation where none of the SoCs (106, 105, . . . , 104) agrees with any other ones of the SoCs (106, 105, . . . , 104), the controller (107) may test the SoCs to positively identify faulty SoCs (106, 105, . . . , and/or 104) for elimination. When only one SoC passes its test, its command can be provided as the output command (224).

Alternatively, when the voting mechanism fails to identify a winner, the command controller (107) generates a safe-mode command or a command for emergency response, similar to the command controller (107) responses to a failure in the memory test (125) in FIG. 2.

Figure 11:
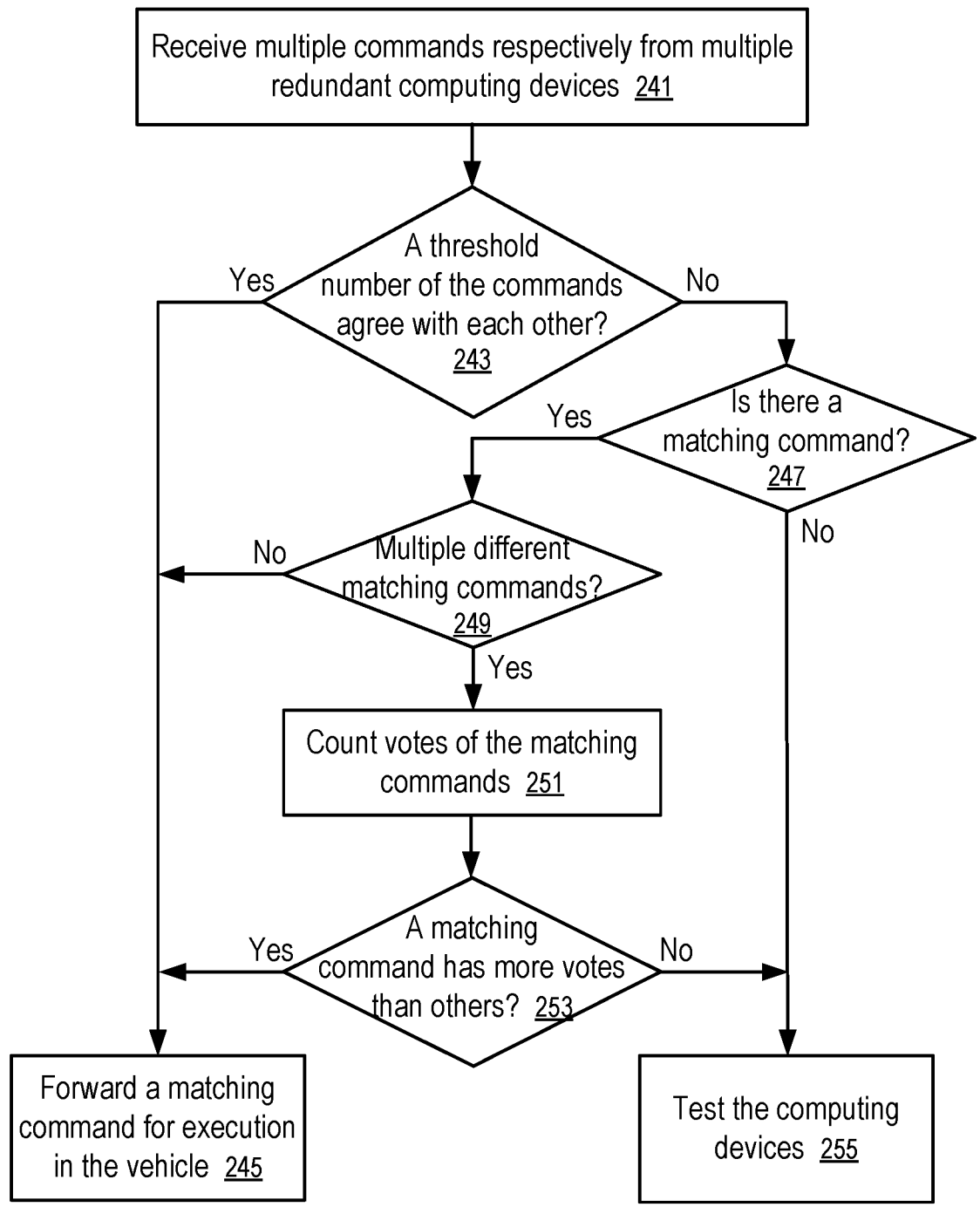
FIG. 11 shows a method of using a voting mechanism to process redundant commands for a vehicle according to one embodiment.

FIG. 11 shows a method of using a voting mechanism to process redundant commands for a vehicle according to one embodiment. For example, the method of FIG. 11 can be implemented in the vehicle (101) of FIG. 9 to perform operations illustrated in FIG. 10.

The method of FIG. 11 includes: receiving (241) multiple commands (222, 123, . . . , 122) respectively from multiple redundant computing devices (106, 105, . . . , 104); and determining (243) whether a threshold number of the commands (222, 123, . . . , 122) agree with each other.

The threshold number is at least two. In some instances, the threshold number is more than a half of the total number of the commands (222, 123, . . . , 122) received in the command controller (107), such that when the threshold number of the commands (222, 123, . . . , 123) agree with each other, the candidate representing the matching output will win regardless of the voting statuses of the remaining commands. In other instances, the threshold number is less than a half of the total number of the commands (222, 123, . . . , 122) received in the command controller (107); however, the threshold number is sufficiently high such that, after counting all of the votes of the commands, the probability of the candidate of the matching commands failing to win is below a threshold.

If it is determined (243) that the threshold number of the commands (222, 123, . . . , 122) agree with each other, the method of FIG. 11 further includes: forwarding (245) a matching command (e.g., 222, 123, . . . , or 122) for execution in the vehicle (101); otherwise, the method of FIG. 11 further includes determining (247) whether there is a matching command within the received commands (222, 123, . . . , 122).

If it is determined (247) that there is no matching command within the received commands (222, 123, . . . , 122), the method of FIG. 11 further includes testing (255) the computing devices (106, 105, . . . , 104) to eliminate faulty ones of the computing devices (106, 105, . . . , 104) and identify a single one of the computing devices (106, 105, . . . , 104) that passes the tests. The command (e.g., 222, 123, . . . , or 122) produced by the single computing device (e.g., 106, 105, . . . , 104) that passes its test is provided as the output command (224). Alternatively or in combination with the testing (225), the method of FIG. 11 includes the generation (151 or 195) of a safe-mode command as in FIG. 3 or FIG. 7.

If it is determined (247) that there is at least one matching command in the set of received commands (222, 123, . . . , 122), the method of FIG. 11 further includes: determining (249) whether there are multiple different matching commands (e.g., multiple subsets of the commands (222, 123, . . . , 122) where commands within each subset match with each other but not across the subsets); and if not, forwarding (245) a matching command (e.g., 222, 123, . . . , or 122) for execution in the vehicle (101).

If it is determined (249) that there are multiple different matching commands in the set of received commands (222, 123, . . . , 122) (e.g., multiple subsets of the commands (222, 123, . . . , 122) where commands within each subset match with each other but not across the subsets), the method of FIG. 11 further includes: counting (251) votes of the matching commands; determining (253) whether a matching command has more votes than others; and if so, forwarding (245) the matching command (e.g., 222, 123, . . . , or 122) that wins the most votes for execution in the vehicle (101). Otherwise, the method of FIG. 11 further includes testing (255) the computing devices (106, 105, . . . , 104) and/or the generation (151 or 195) of a safe-mode command as in FIG. 3 or FIG. 7.

Figure 12:
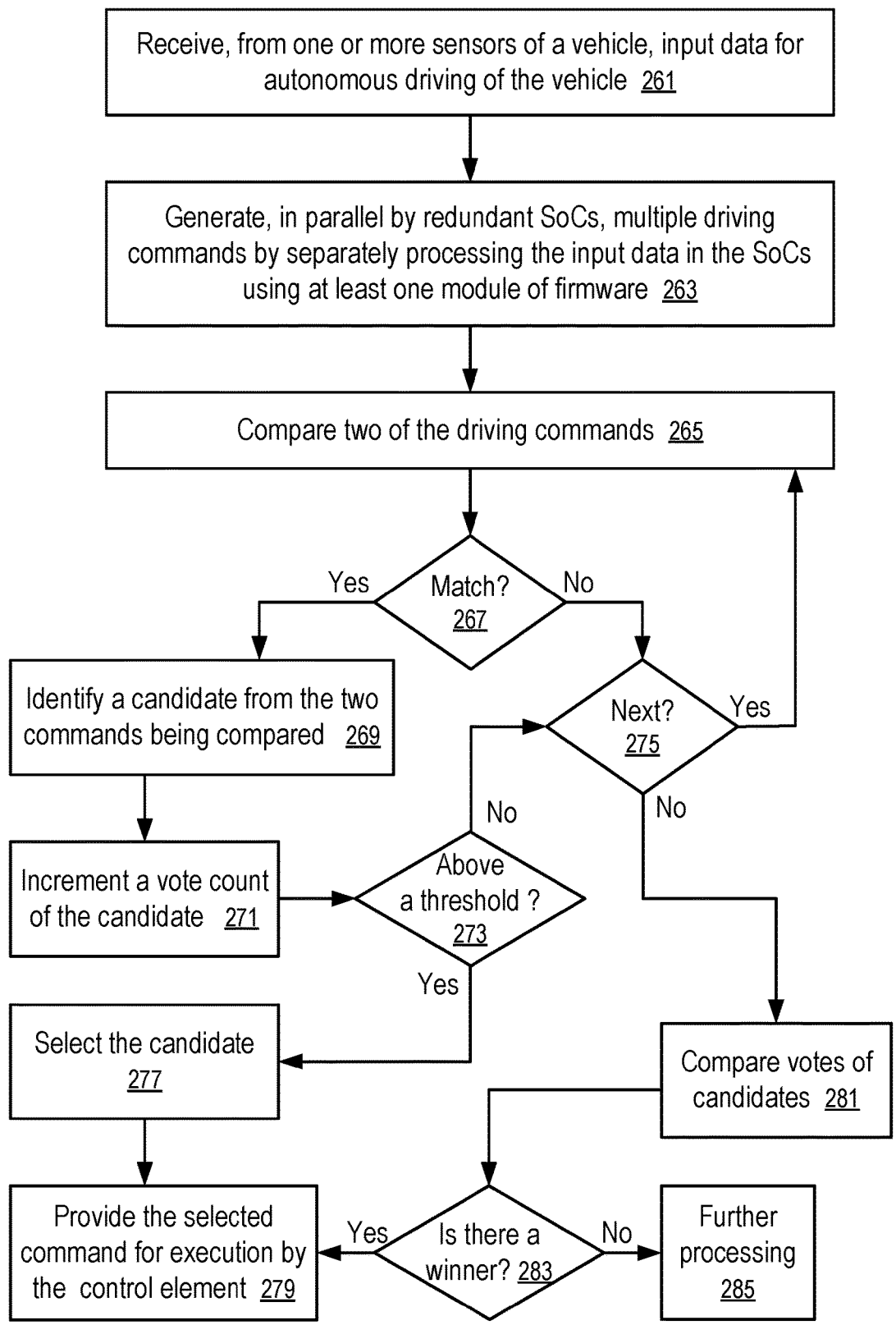
FIG. 12 shows a detailed method to reliably operate a vehicle in autonomous driving according to one embodiment.

FIG. 12 shows a detailed method to reliably operate a vehicle in autonomous driving according to one embodiment. For example, the method of FIG. 12 can be implemented in the vehicle (101) of FIG. 9 to perform operations illustrated in FIG. 10.

The method of FIG. 12 includes: receiving, (261) from one or more sensors (103) of a vehicle (101), input data (121) for autonomous driving of the vehicle (101); generating (263), in parallel by redundant SoCs (106, 105, . . . , 104), multiple driving commands (222, 123, . . . , 122) by separately processing the input data (121) in the SoCs (106, 105, . . . , 104), using at least one module of firmware (115); comparing (265) two of the driving commands (e.g., 222, 123); determining (267) whether there is a match between the two of the driving commands that are being compared; and if so, identifying (269) a candidate from the two commands being compared, incrementing (271) a vote count of the candidate, and determining (273) whether the vote count is above a threshold. The threshold may be two or more, and/or be less or more than a half of the total number of the multiple driving commands (222, 123, . . . , 122).

If it is determined (273) that the vote count for the candidate is above the threshold, the method of FIG. 12 further includes: selecting (277) the candidate for output; and providing (279) the selected command for execution by the control element (109).

If it is determined (267) that there is no match between the two of the driving commands that are being compared, or it is determined (273) that the vote count for the candidate is below the threshold, the method of FIG. 12 further includes: determining (275) whether there is a next pair of commands (222, 123, . . . , 122) to be prepared; and if so, the comparing (265) is repeated for the next pair. Otherwise, the method of FIG. 11 further includes comparing (281) votes of candidates, if any.

If it is determined (283) there is a winner that has the most votes as a result of comparing (265) pairs of the driving commands (222, 123, . . . , 122), the winning candidate is selected and provided (279) for execution by the control element (109). Otherwise, the method of FIG. 12 includes performing (285) further processing, such as the generation (151 or 195) of a safe-mode command as in FIG. 3 or FIG. 7 and/or the initiation (175 or 219) of an emergency response as in FIG. 4 or FIG. 8.

Optionally, when a SoC (e.g., 106, 105, . . . , or 104) is identified to be faulty for failing to win the vote and/or for failing a memory test, any of the above discussed methods can further include the repairing of the SoC (e.g., 106, 105, . . . , or 104) by copying the corresponding data from a healthy redundant SoC (e.g., 106, 105, . . . , or 104) or from a remote server.

The present disclosure includes methods and apparatuses which perform these methods, including data processing systems which perform these methods, and computer readable media containing instructions which when executed on data processing systems cause the systems to perform these methods.

The SoC (105), the command controller (107) and/or the computer system for the autonomous driving of the vehicle (101) can be implemented as one or more data processing systems.

A typical data processing system may include includes an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method implemented on a vehicle, the method comprising:
   receiving, in a command controller, multiple commands respectively from multiple computing devices configured on the vehicle, the multiple commands configured to adjust operations of a control element of the vehicle during autonomous driving;
   matching, by the command controller, the multiple commands with each other to identify votes for the multiple commands, wherein a vote count of each respective command in the multiple commands identifies a number of matching ones in the multiple commands that match with the respective command;
   identifying, by the command controller, a first command from the multiple commands based on a has a winning vote count of the first command; and
   forwarding, from the command controller, the first command for execution via the control element of the vehicle.

2. The method of claim 1, wherein the first command has the winning vote count when a vote count of the first command is above a threshold.

3. The method of claim 2, wherein the threshold is more than half of a count of the multiple computing devices.

4. The method of claim 2, wherein the threshold is less than half of a count of the multiple computing devices.

5. The method of claim 2, further comprising:
   stopping the matching to identify additional matches within the multiple commands in response to a determination that the first command has a vote count that is above the threshold.

6. The method of claim 2, further comprising:
   in response to a determination that within the multiple commands there is a tie in winning vote count between two commands that do not match with each other, initiating tests of at least a portion of the multiple computing devices.

7. The method of claim 6, wherein tested computing devices within the portion that output commands, among the multiple commands received in the command controller, that match any of the two commands having the tie.

8. The method of claim 7, further comprising:
   testing memories of the tested computing devices within the portion; and
   breaking the tie based on a failed memory test in the portion of the multiple computing devices.

9. The method of claim 8, wherein the testing comprises:
   testing the memories of the tested computing devices in parallel, section by section to identify a second command in the two commands having the tie, the second command being generated by a computing device that failed a memory test;
   wherein the first command is different from the second command in the two commands having the tie.

10. The method of claim 2, wherein the forwarding is performed before completion of the matching in identifying all possible matches within the multiple commands and is in response to a determination that the first command has a vote count that is above the threshold.

11. The method of claim 10, further comprising:
   after the forwarding, continuing the matching to identify, among the multiple commands, a second command that does not match the first command; and
   testing a memory of a first computing device among the multiple computing devices, wherein the second command is provided from the first computing device to the command controller.

12. The method of claim 11, wherein the testing the memory of the first computing device includes:
   comparing content retrieved from the memory of the first computing device with content retrieved from a memory of a second computing device among the multiple computing devices, the first command is provided from the second computing device.

13. The method of claim 12, further comprising:
   copying a portion of the content from the second computing device to the first computing device to replace a corresponding portion of the content previously stored in the first computing device in repairing a redundant function of the first computing device in producing commands to the command controller.

14. The method of claim 1, further comprising:
   skipping memory tests of the multiple computing devices in response to a determination that the first command has the winning vote count.

15. A vehicle, comprising:
   a control element;
   multiple computing devices having redundant functions in generating multiple commands during autonomous driving of the vehicle, the command to be effectuated by the control element of the vehicle;
   a command controller coupled between the control element and the multiple computing devices, wherein in response to receiving the multiple commands from the multiple computing devices, the command controller:
      matches the multiple commands with each other to identify votes for the multiple commands, wherein a vote count of each respective command in the multiple commands identifies a number of matching ones in the multiple commands that match with the respective command;
      identify a first command from the multiple commands based on a has a winning vote count of the first command; and
      forwards the first command for execution via the control element of the vehicle.

16. The vehicle of claim 15, wherein each of the multiple computing devices are sealed in one integrated circuit package for a system on chip; and the command controller is external to the system on chip.

17. The vehicle of claim 15, further comprising:
   at least one sensor to generate input data for the computing device, wherein the computing device generates the command based on the input data.

18. The vehicle of claim 17, wherein the at least one sensor includes at least one of:
   a camera;
   an infrared camera;
   a sonar;
   a radar; and
   a lidar.

19. The vehicle of claim 17, wherein the one of the two commands forwarded for execution causes the control element to adjust at least one of:
   acceleration of the vehicle;
   speed of the vehicle; and
   direction of the vehicle.

20. A non-transitory computer storage medium storing instructions which when executed by a controller of a vehicle causes the controller to perform a method, the method comprising:
- receiving, in the controller, multiple commands respectively from multiple computing devices configured on the vehicle, the multiple commands configured to adjust operations of a control element of the vehicle during autonomous driving;
- matching, by the controller, the multiple commands with each other to identify votes for the multiple commands, wherein a vote count of each respective command in the multiple commands identifies a number of matching ones in the multiple commands that match with the respective command;
- identifying, by the controller, a first command from the multiple commands based on a has a winning vote count of the first command; and
- forwarding, from the controller, the first command for execution via the control element of the vehicle.

* * * * *